United States Patent
Sorenson et al.

(10) Patent No.: US 11,513,290 B2
(45) Date of Patent: Nov. 29, 2022

(54) STRIP STOP MECHANISM USING ROTATING LEVER AS A POSITIONING STOP

(71) Applicant: CommScope Technologies LLC, Hickory, NC (US)

(72) Inventors: Lawrence Joseph Sorenson, Bloomington, MN (US); Elmand Mario Renova Gonzalez, Delicias (MX)

(73) Assignee: CommScope Technologies LLC, Hickory, NC (US)

( * ) Notice: Subject to any disclaimer, the term of this patent is extended or adjusted under 35 U.S.C. 154(b) by 177 days.

(21) Appl. No.: 17/006,083

(22) Filed: Aug. 28, 2020

(65) Prior Publication Data

US 2021/0063642 A1 Mar. 4, 2021

Related U.S. Application Data

(60) Provisional application No. 62/894,318, filed on Aug. 30, 2019.

(51) Int. Cl.
*G02B 6/245* (2006.01)
*H02G 1/12* (2006.01)

(52) U.S. Cl.
CPC .......... *G02B 6/245* (2013.01); *H02G 1/1256* (2013.01)

(58) Field of Classification Search
CPC ............................. G02B 6/245; H02G 1/1256
See application file for complete search history.

(56) References Cited

U.S. PATENT DOCUMENTS

| 3,182,532 A | 5/1965 | Dehlerking |
| 4,059,892 A | 11/1977 | Siden |
| 4,283,971 A | 8/1981 | Hetmanski |
| 4,464,817 A * | 8/1984 | Johnson, Jr. ......... G02B 6/3855 29/33 M |
| 4,584,912 A | 4/1986 | Gudmestad et al. |

(Continued)

FOREIGN PATENT DOCUMENTS

| DE | 203 01 693 U1 | 4/2003 |
| EP | 0 710 858 A1 | 5/1996 |

(Continued)

OTHER PUBLICATIONS

Schleuniger®, FiberStrip 7030/7035—Stripping Machines, 4 pages (Mar. 2005).

*Primary Examiner* — Andrew Jordan
(74) *Attorney, Agent, or Firm* — Merchant & Gould P.C.

(57) ABSTRACT

A strip stop mechanism for a fiber stripping machine including a channel for receiving an optical fiber. The strip stop mechanism can include a lever operably mounted to the fiber stripping machine, the lever extending between a first end and a second end and being rotatable between a first position and a second position. When the lever is in the first position, the first end of the lever resides within the channel to provide an end stop for the optical fiber. When the lever is in the second position, the first end of the lever is at least partially withdrawn from the channel and the fiber stripping machine is activated. A second end of the lever can be configured to depress an activation button of the fiber stripping machine once the first end of the lever is at least partially removed from the channel.

20 Claims, 7 Drawing Sheets

(56) References Cited

U.S. PATENT DOCUMENTS

| | | |
|---|---|---|
| 4,601,093 A | 7/1986 | Cope |
| 4,619,164 A | 10/1986 | Aikens |
| 4,745,828 A | 5/1988 | Stepan |
| 4,784,024 A | 11/1988 | Butler |
| 4,815,207 A | 3/1989 | Schwartzman |
| 4,932,299 A | 6/1990 | Haines et al. |
| 4,969,703 A | 11/1990 | Fyfe et al. |
| 4,993,147 A | 2/1991 | Carpenter et al. |
| 5,003,846 A | 4/1991 | Yagawa |
| 5,010,797 A | 4/1991 | Stepan |
| 5,016,500 A | 5/1991 | Conrad et al. |
| 5,172,620 A | 12/1992 | Faust |
| 5,269,206 A | 12/1993 | Yagawa |
| 5,295,421 A | 3/1994 | Mansfield |
| 5,320,002 A | 6/1994 | Sayyadi et al. |
| 5,351,580 A | 10/1994 | Potesta et al. |
| 5,398,573 A | 3/1995 | Wollermann |
| 5,438,753 A | 8/1995 | Stepan |
| 5,445,051 A | 8/1995 | Carpenter et al. |
| 5,517,881 A | 5/1996 | Burns |
| 5,561,899 A | 10/1996 | Carpenter et al. |
| 5,582,078 A | 12/1996 | Talley |
| 5,669,276 A | 9/1997 | Spacek |
| 5,787,768 A | 8/1998 | Talley |
| 6,023,844 A | 2/2000 | Hinson, II et al. |
| 6,176,155 B1 | 1/2001 | Palmowski et al. |
| 6,237,743 B1 | 5/2001 | Bracher |
| 6,286,393 B1 | 9/2001 | Messer et al. |
| 6,321,621 B1 | 11/2001 | Stepan |
| 6,360,430 B1 | 3/2002 | Stepan |
| 6,561,061 B1 | 5/2003 | Stepan |
| 6,718,624 B1 | 4/2004 | Rohrbach et al. |
| 6,910,256 B2 | 6/2005 | Locher et al. |
| 6,983,534 B2 | 1/2006 | Zeibig et al. |
| 7,152,513 B2 | 12/2006 | Palmowski |
| 7,681,476 B2 | 3/2010 | Fritsche |
| 9,958,610 B2 * | 5/2018 | Zhao ................. G02B 6/245 |
| 2021/0063642 A1 * | 3/2021 | Sorenson ............ G02B 6/245 |
| 2021/0356667 A1 * | 11/2021 | Murgatroyd .......... G02B 6/25 |

FOREIGN PATENT DOCUMENTS

| | | |
|---|---|---|
| EP | 1 037 077 A2 | 9/2000 |
| EP | 1 070 374 B1 | 3/2002 |
| EP | 1 413 903 A1 | 4/2004 |
| JP | 11-84138 A | 3/1999 |
| WO | 89/02796 A1 | 4/1989 |
| WO | 98/33082 A1 | 7/1998 |

* cited by examiner

STRIP STOP MECHANISM USING ROTATING LEVER AS A POSITIONING STOP

CROSS-REFERENCE TO RELATED APPLICATIONS

This applications includes the disclosure of U.S. Application Ser. No. 62/894,318, filed Aug. 30, 2019. A claim of priority is made to U.S. Application Ser. No. 62/894,318. The entire disclosure of U.S. Application Ser. No. 62/894,318 is incorporated herein by reference.

BACKGROUND

Machines for stripping fiber optic cables are known. Existing machines typically use a scale printed on heated grippers to provide an indication for the operator to position a fiber to the correct strip distance. Alternatively the fiber is marked with a pen to be positioned for the correct strip distance. Fibers stripped too short or too long may be problematic if a specific strip length is needed for a certain application. Improvements are desired.

Machines for stripping fiber optic cables are known. Existing machines typically use a scale printed on heated grippers to provide an indication for the operator to position a fiber to the correct strip distance. Alternatively the fiber is marked with a pen to be positioned for the correct strip distance. Fibers stripped too short or too long may be problematic if a specific strip length is needed for a certain application. Improvements are desired.

SUMMARY

A strip stop mechanism for a fiber stripping machine is disclosed. In one aspect, an apparatus for stripping an optical fiber can include a fiber stripping machine including a channel for receiving the optical fiber and can include a lever rotatable with respect to the fiber stripping machine, the lever extending between a first end and a second end and being rotatable between a first position and a second position. When the lever is in the first position, the first end of the lever resides within the channel to provide an end stop for the optical fiber. When the lever is in the second position, the first end of the lever is at least partially withdrawn from the channel and the fiber stripping machine is activated.

In some examples, the fiber stripping machine includes an activation button, and wherein the second end of the lever depresses the activation button when the lever is in the second position.

In some examples, the apparatus includes a base mounted to the fiber stripping machine, wherein the lever is rotatably mounted to the base.

In some examples, the base is removably mounted to the fiber stripping machine.

In some examples, the lever includes a main body and an end piece, the end piece being removable from the main body.

In some examples, the end piece is formed from a first material and the main body is formed from a second material different from the first material.

In some examples, the lever is configured and mounted such that gravity holds the lever in the first position unless overcome by a depressing force at the second end of the lever.

In some examples, the center of gravity of the lever is located between the first end of the lever and a pivot axis of the lever.

A strip stop mechanism for a fiber stripping machine can include a base mountable to the fiber stripping machine and a lever rotatably mounted to the base, the lever extending between a first end and a second end and a second end, the first end defining an end stop for an optical cable inserted into the fiber stripping machine, the second end defining a handle portion for moving the lever from a first position to a second position.

In some examples, the base includes mounting locations for mounting the base to the fiber stripping machine.

In some examples, the lever includes a main body and an end piece, the end piece being removable from the main body.

In some examples, the end piece is formed from a first material and the main body is formed from a second material different from the first material.

In some examples, when the base is mounted to the fiber stripping machine, gravity holds the lever in the first position unless overcome by a depressing force at the second end of the lever.

In some examples, the center of gravity of the lever is located between the first end of the lever and a pivot axis of the lever.

A method of stripping an optical fiber is disclosed. The method can include the steps of inserting the optical fiber into a channel of a fiber stripping machine until an end of the fiber abuts a first end of a lever residing within the channel, moving the lever to cause the first end of the lever to at least be partially removed from the channel, and activating the fiber stripping machine to strip the optical fiber.

In some examples, the step of moving the lever includes moving or rotating the lever to cause a second end of the lever to contact an activation button of the fiber stripping machine.

In some examples, the method includes the step of clamping the optical fiber prior to the step of moving the lever.

In some examples, the step of activating the fiber stripping machine includes clamping the optical fiber with grippers within the channel.

In some examples, the method includes the step of releasing the lever once the optical fiber has been stripped by the fiber stripping machine.

In some examples, the method includes the step of selecting and mounting an end piece onto a main body of the lever, the end piece having a predetermined length defining a stripping length for the optical fiber.

In some examples, the step of moving the lever includes rotating the lever.

BRIEF DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

DETAILED DESCRIPTION

Figure 1:
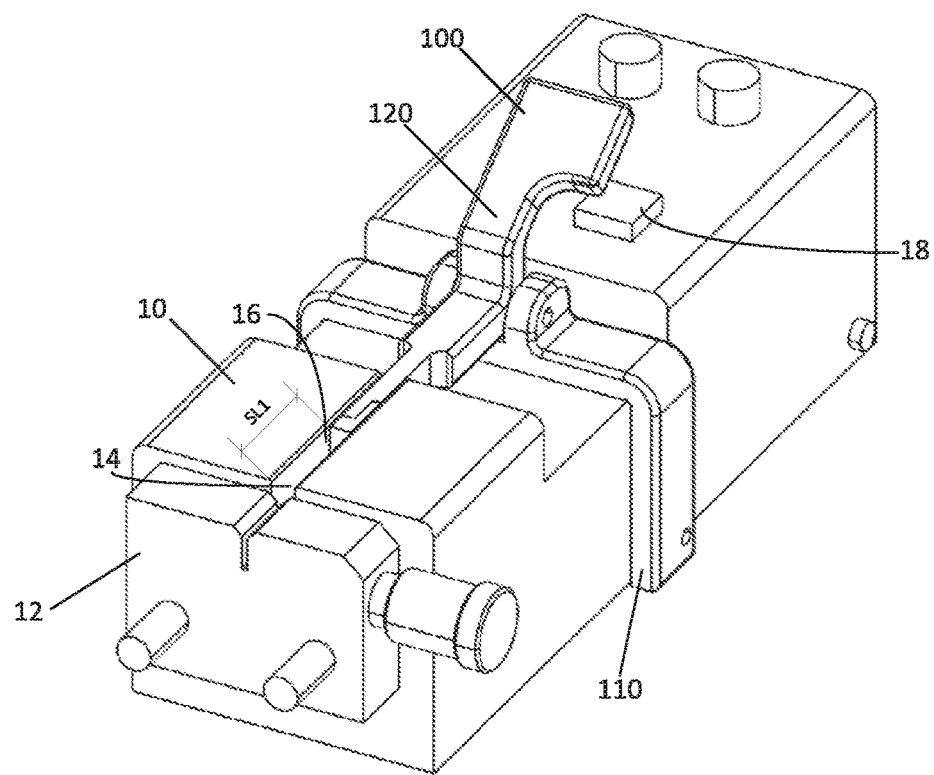
FIG. 1 is a front perspective view of a strip stop mechanism mounted to a fiber stripping machine having features in accordance with the present design, with the strip stop mechanism in a first position.
Figure 2:
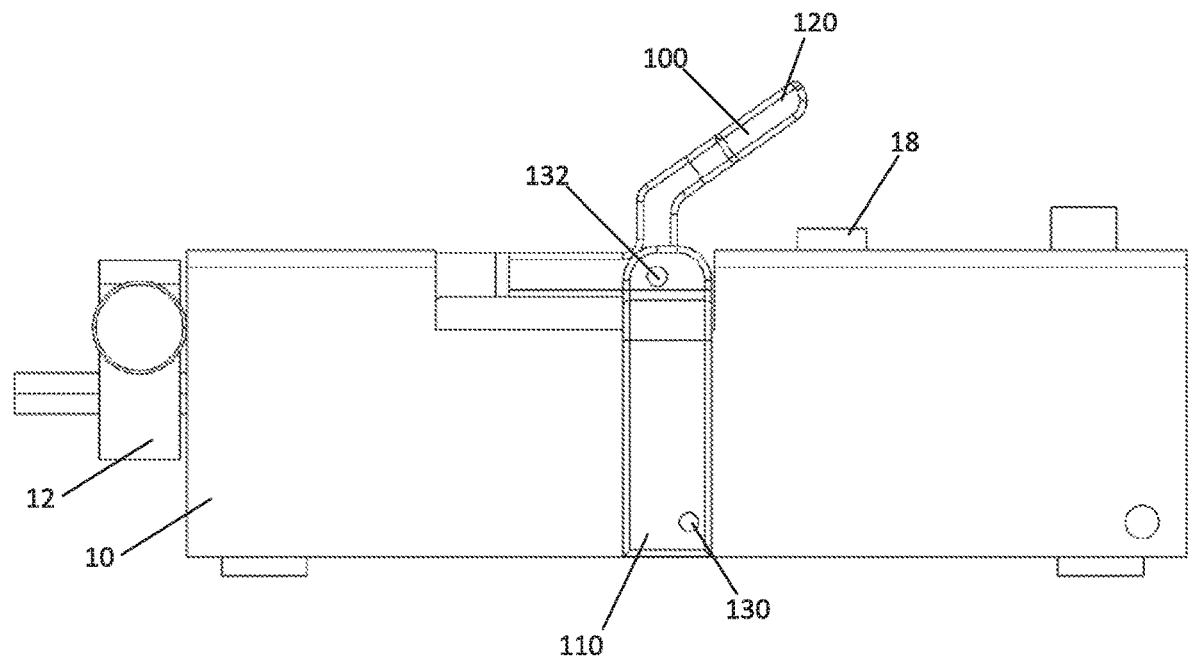
FIG. 2 is a side view of the strip stop mechanism and fiber stripping machine shown in FIG. 1.
Figure 3:
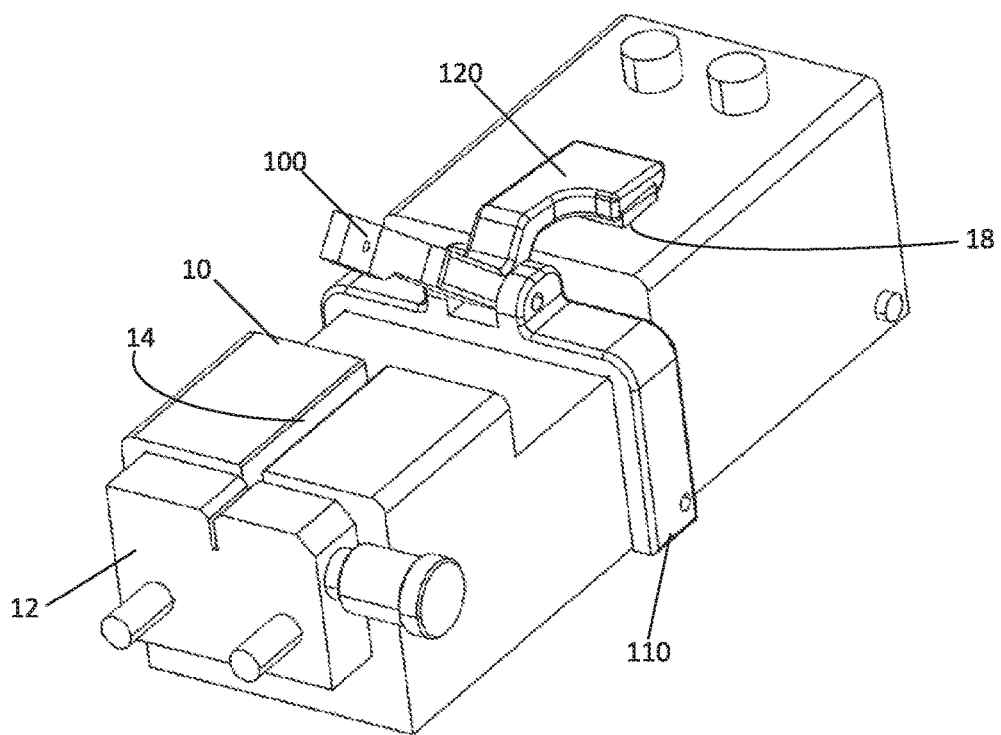
FIG. 3 is a front perspective view of the strip stop mechanism and fiber stripping machine shown in FIG. 1, with the strip stop mechanism operated into a second position.
Figure 4:
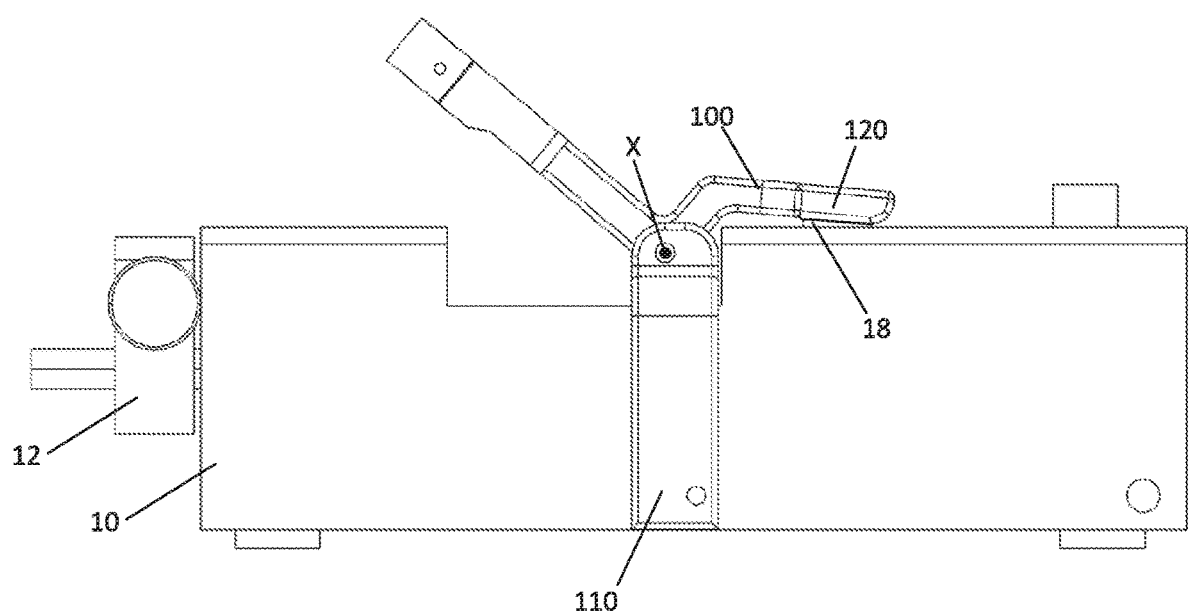
FIG. 4 is a side view of the strip stop mechanism and fiber stripping machine shown in FIG. 3.
Figure 5:
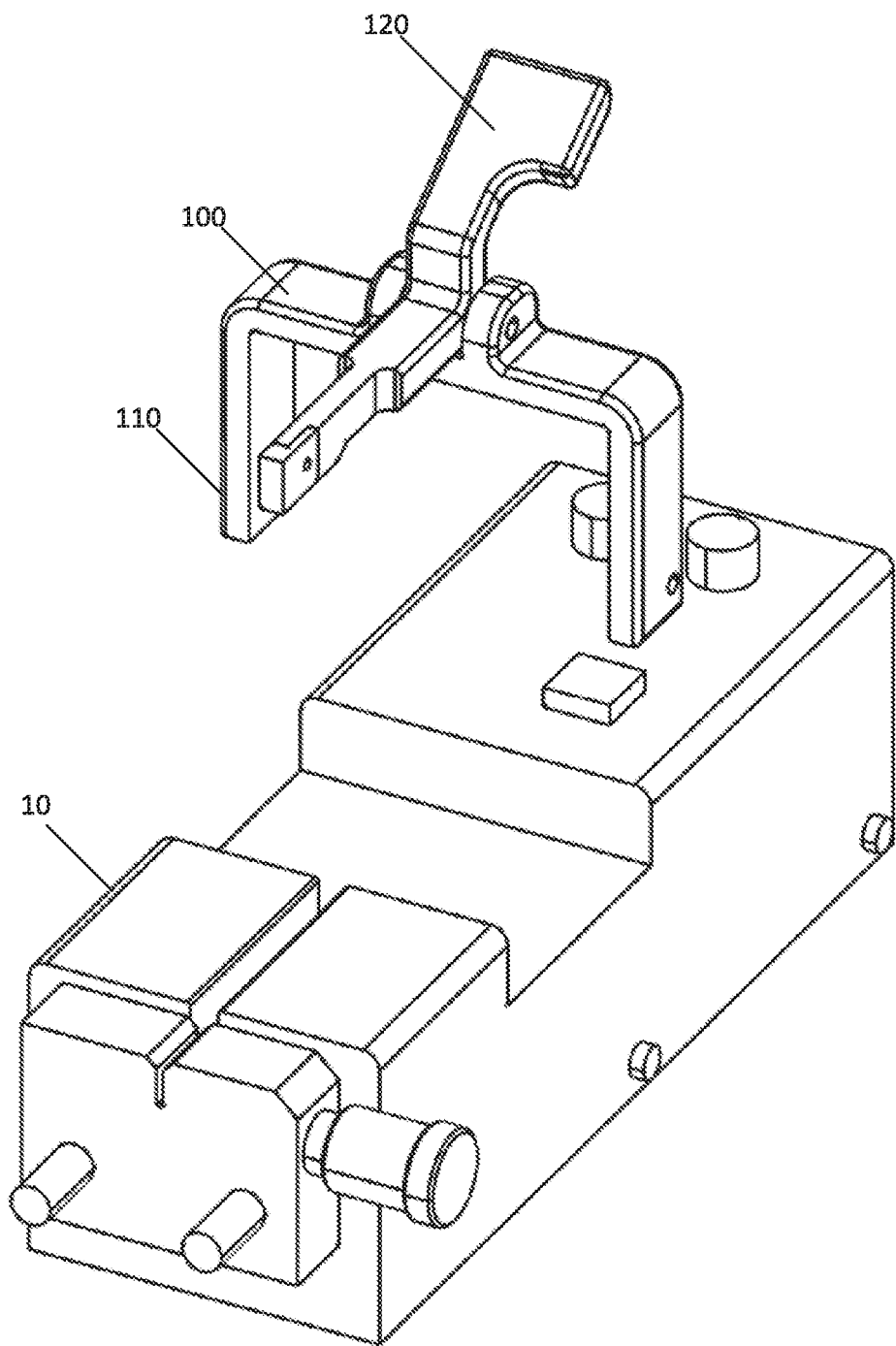
FIG. 5 is an exploded perspective view of the strip stop mechanism and fiber stripping machine shown in FIG. 1.
Figure 6:
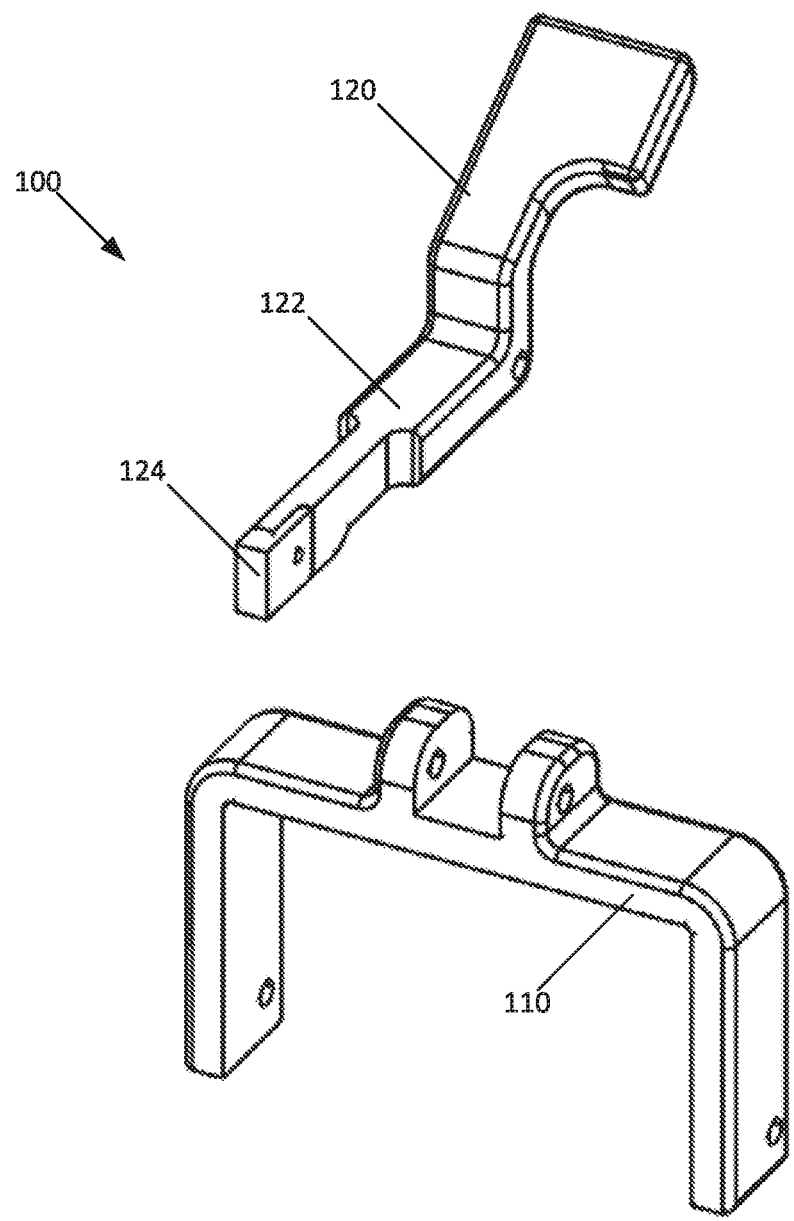
FIG. 6 is an exploded perspective view showing a base portion and a lever portion of the strip stop mechanism shown in FIG. 5.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Referring to FIGS. 1 to 4, a fiber stripping machine 10 and a strip stop mechanism 100 are presented. As shown, the fiber stripping machine 10 includes a manual clamp 12, a channel 14, movable grippers 16, and an activation button 18. To strip an optical fiber, a fiber is inserted into the channel 14, the manual clamp is moved into a closed position to secure the fiber within the channel 14, and the activation button is depressed which causes the movable grippers 16 to engage and strip the fiber. An example fiber stripping machine configured in such a manner is the FiberStrip 7030 manufactured by Schleuniger, Inc. of Thun, Switzerland.

As noted above, the extent to which the optical fiber is inserted into the channel, which determines the length of the fiber that will be stripped, is typically only loosely approximated by making a marking on the fiber or by referring to a scale mounted to the fiber stripping machine. With such an approach, the stripped length of the fibers necessarily varies from one fiber to the other, which is undesirable. To resolve this issue, the disclosed strip stop mechanism 100 can be mounted to the fiber stripping machine 10, as is described in further detail herein. It is noted that although the disclosure presents a configuration in which the strip stop mechanism 100 is mounted to or retrofitted onto an existing fiber stripping machine 10, a fiber stripping machine can be designed and configured to have a strip stop mechanism 100 that is an integrally formed portion of a stripping machine.

Figure 7:
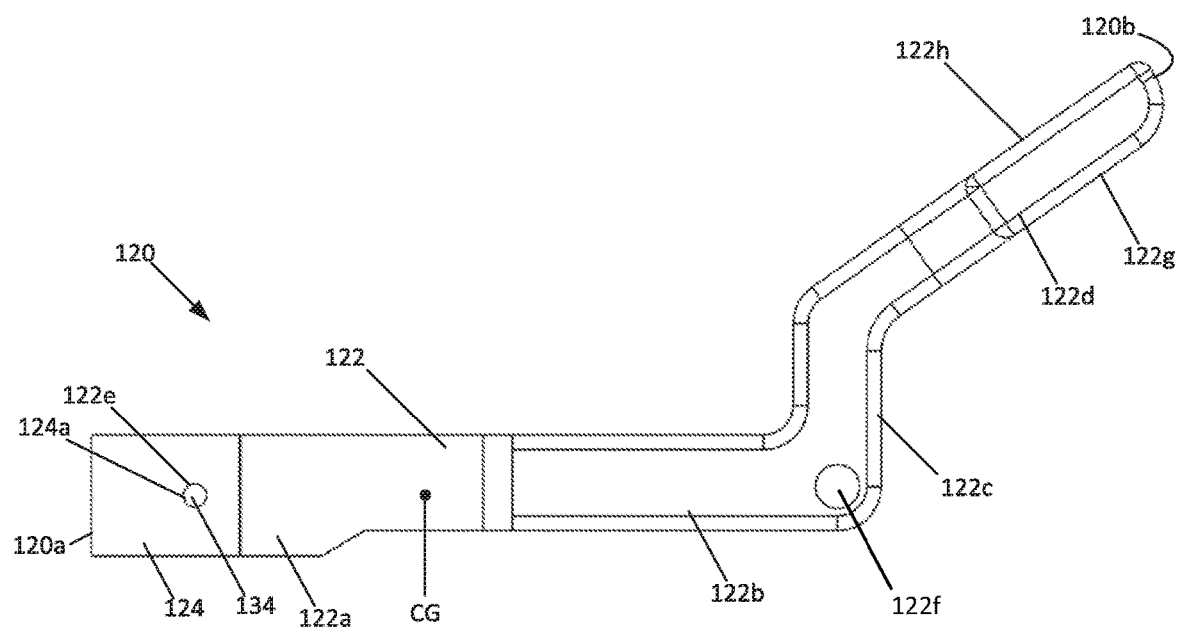
FIG. 7 is a side view of a lever portion of the strip stop mechanism shown in FIG. 6.
Figure 8:
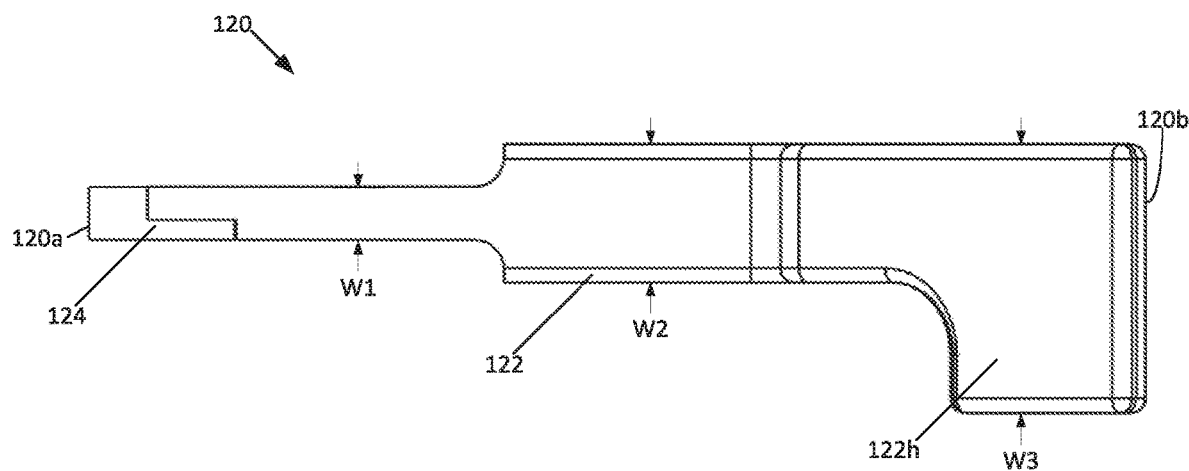
FIG. 8 is a top view of the lever portion shown in FIG. 7.
Figure 9:
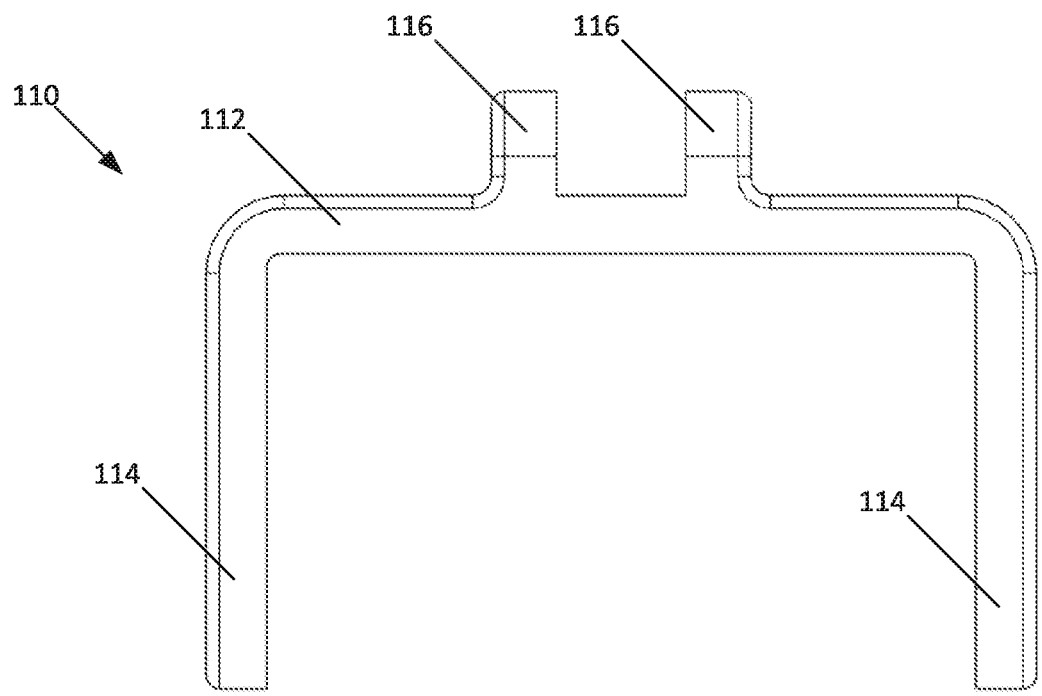
FIG. 9 is a front view of a base portion of the strip stop mechanism shown in FIG. 6.
Figure 10:
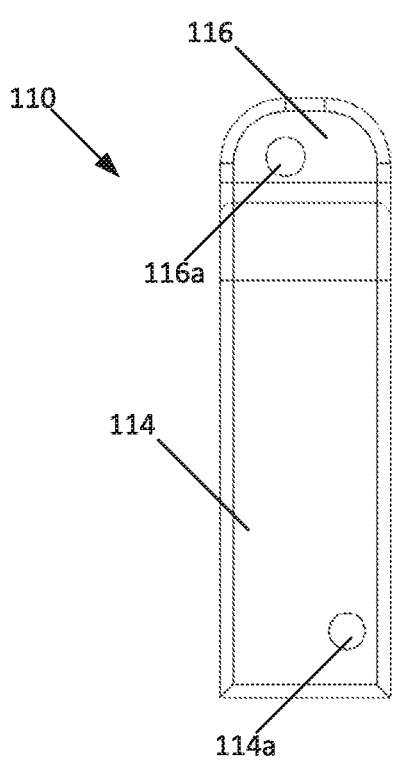
FIG. 10 is a side view of the base portion shown in FIG. 9.

In the example shown, the strip stop mechanism 100 includes a base 110 and a lever 120. The base 110 connects to the stripping machine 10 and supports the lever 120 such that the lever 120 can rotate with respect to the base 110. The base 110 is shown in isolation at FIGS. 9 and 10 while the lever is shown in isolation at FIGS. 7 and 8. In one aspect, the base 110 has a main body 112 defining a first pair of spaced apart support arms 114 and a second pair of spaced apart support arms 116. Each of the pairs of support arms 114, 116 extend generally orthogonally from a base member 118.

The first pair of support arms 114 are spaced a distance apart a distance generally equal to the width of the fiber stripping machine 10 such that the support arms 114 can straddle the fiber stripping machine 10 with the base member 118 resting along a top portion of the fiber stripping machine 10. The first pair of support arms 114 are also shown as being provided with apertures 114a for receiving fasteners 130 such that the base 110 can be secured to the fiber stripping machine 10.

The second pair of support arms 116 are spaced apart a distance generally equal to the width of the lever 120 such that the lever 120 can be received between the support arms 116. Each of the support arms 116 is provided with an aperture for receiving a pin 132 or other member that extends through the lever 120 such that the lever 120 can be secured to the support arms 116 while being rotatable with respect to the base 110.

As presented, the lever 120 extends between a first end 120a and a second end 120b. In one aspect, the lever 120 includes a main body 122 and an end piece 124 attached to the main body 122. In some implementations, the lever 120 can be formed as a single, unitary component rather than as an assembly. The main body 122 can be characterized as having first through fourth segments or portions 122a-122d. The first portion 122a is provided with a relatively narrow width w1 that is slightly less than the width of the channel 14 of the fiber stripping machine 10. The first portion 122a is also provided with an aperture 122e for receiving a fastener 134 for securing the end piece 124 to the main body 122. In one example, the aperture 122e has a countersink to allow a screw head to be flush mounted into the main body 122. In one aspect, the end of the first portion 122a proximate the aperture 122e is provided with a first half of a lap joint and the end piece 124 is provided with a second half of a lap joint such that, when joined together, the end piece 124 and the first portion 122a have the first width w1 from a distal end of the end piece 124 to the opposite end of the first portion 122a. The end piece 124 can be provided with an aperture 124a, for example a threaded aperture, at the location of the joint to receive the fastener 134 such that the end piece 124 is secured to the main body 122. The second portion 122b is adjacent the first portion 122a and has a relatively greater width w2 and further includes an aperture 122f for receiving the pin 132 extending through the base support arm apertures 116a. The third portion 122c is adjacent the second portion 122b and extends generally orthogonally from the second portion 122b while having the same width w2 as the second portion 122b. The fourth portion 122d is adjacent the third portion 122c and extends at an oblique angle from the third portion 122c. In the example shown, the third and fourth portions 122c, 122d have an interior angle of about 120 degrees. Other angles are possible. In general, the length and angle of the third and fourth portions 122c, 122d are set such that, when the lever 120 is rotated, a bottom surface 122g of the fourth portion 122d will contact and depress the activation button 18 of the fiber stripping machine 10 after the first portion 122a has been rotated out of the channel 14 of the fiber stripping machine. As the grippers 16 of the fiber stripping machine 10 extend into the channel 14 once the machine 10 is activated, it is important for the first portion 122a to be removed from the channel 14 before the machine 10 is activated. It is to be understood that the lever 120 can be provided with different portions and orientations to accomplish this purpose and function without departing from the concepts presented herein.

In one aspect, the fourth portion 122d also defines a top surface 122h opposite the bottom surface 122g. The top and bottom surfaces 122h, 122g have a width w3 that is greater than the width w2. This greater width provides a relatively larger area that enables the bottom surface 122g to more readily engage the fiber stripping machine activation button 18. This greater width also provides a user or operator with a relatively larger surface for depressing the second end 120b of the lever 120.

In one aspect, the end piece 124 defines the first end 120a of the lever 120. The end piece 124 functions to extend the length of the main body 122 and ultimately defines the length SL1 (see FIG. 1) of the optical fiber that will be stripped by the fiber stripping machine 10. In the example shown, the end piece 124 is removable from the main body 122, as described above, and replaced with other end pieces 124 having different lengths such that a desired stripping length SL1 can be implemented for any given application. When the end piece 124 is formed from a metal material and the main body 122 is formed from a polymeric material, the end piece 124 also functions to add weight to the first end 120a of the lever. Such a configuration results in the center of gravity CG of the lever being located further towards the first end 120a and also between the first end 120a and the aperture 122f, which defines the pivot axis X of the lever 120. Such a configuration is advantageous in that, after an operator moves the lever 120 to a second position, in which the button 18 has been activated, and subsequently removes pressure from the second end 120b of the lever 120, the lever 120 will automatically return by the force of gravity to a first position in which the first end 120a resides within the channel 14. The strip stop mechanism 100 can also be provided with a return spring to further bias the lever 120 into the first position.

Figure 11:
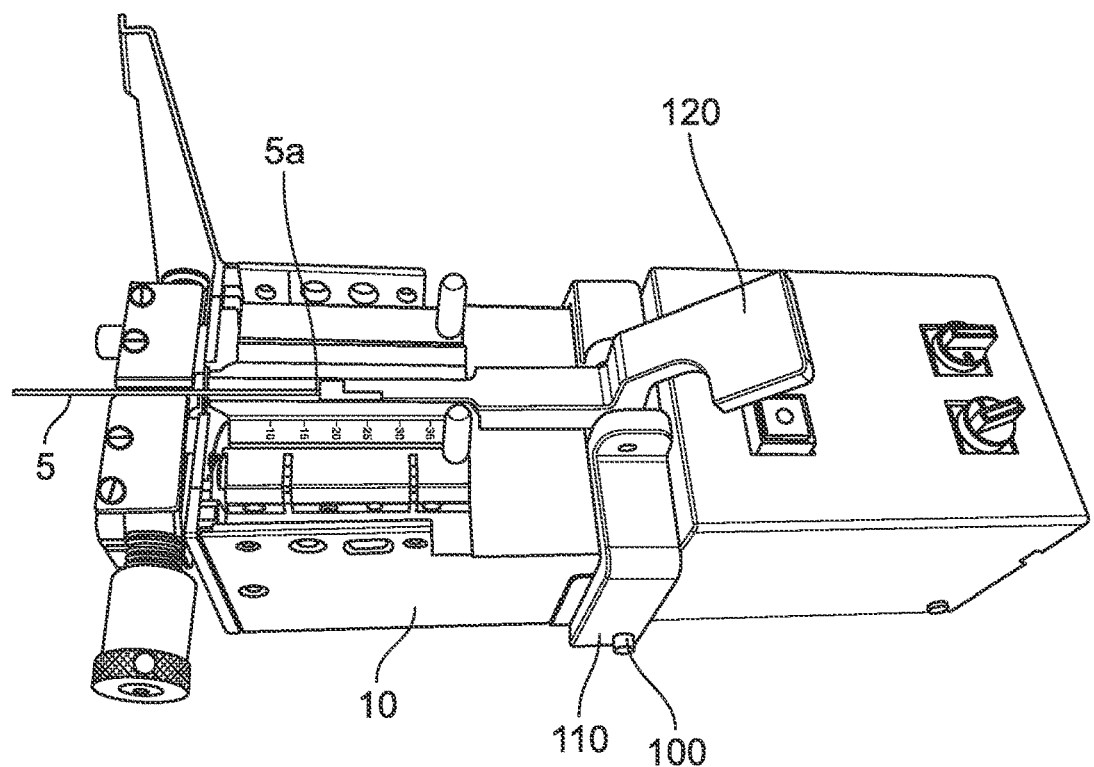
FIG. 11 is a perspective view of the strip stop mechanism and fiber stripping machine shown in FIG. 1 schematically showing an optical cable inserted into the fiber stripping machine such that the optical cable abuts the end of the lever portion of the strip stop mechanism.
Figure 12:
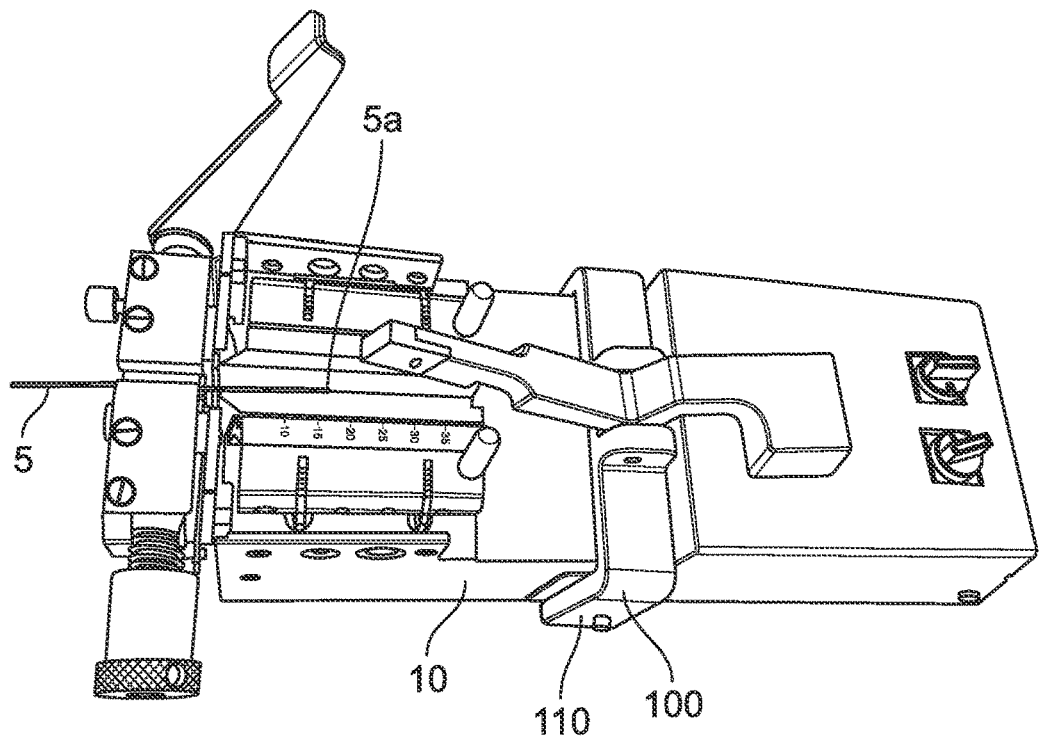
FIG. 12 is a perspective view of the strip stop mechanism and fiber stripping machine shown in FIG. 11, with the strip stop mechanism being moved into the second position to activate the fiber stripping machine.

Referring to FIGS. 11 and 12, the optical fiber stripping process is further illustrated. As can be seen at FIG. 11, the lever 120 is in a first position with the first end 120a of the lever 120 residing within the channel 14. In a first step, an optical fiber 5 is inserted into the channel 14 of the fiber stripping machine 10 until an end 5a of the fiber abuts the first end 120a of the lever 120 residing within the channel 14. Once this step has been completed, the manual clamp 12 can be operated to clamp the optical fiber into a fixed position. The lever 120 can then be rotated by an operator, for example by depressing the top surface 122h at the second end 120b of the lever 120, such that the first end 120a the lever 120 to at least be partially removed from the channel 14, as shown at FIG. 12. This motion continues until the bottom surface 122g of the lever 120 contacts and depresses the activation button 18 of the fiber stripping machine 10. Once the fiber stripping machine 10 is activated, the grippers 16 enter the channel 14, strip the optical fiber 5, and then exit the channel 14. Once the stripping step is complete, the operator can release the lever 120, which as explained previously, will return to the first position with the first end 120a residing within the channel 14 by the force of gravity. Once the manual clamp 12 is released, the stripped optical fiber 5 can be removed from the fiber stripping machine 10 and a new optical fiber 5 can be inserted and stripped in the same manner.

Many materials can be used for the components of the disclosed strip stop mechanism 100. For example, the components of the strip stop mechanism 100 can be formed from metal and/or polymeric materials. In one example, the base 110 and the end piece 124 are be formed from a metal material while the lever arm 120 is formed from a polymeric material.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. An apparatus for stripping an optical fiber, the apparatus comprising:
  a) a fiber stripping machine including a channel for receiving the optical fiber; and
  b) a lever rotatable with respect to the fiber stripping machine, the lever extending between a first end and a second end and being rotatable between a first position and a second position;
  c) wherein, when the lever is in the first position, the first end of the lever resides within the channel to provide an end stop for the optical fiber;
  d) wherein, when the lever is in the second position, the first end of the lever is at least partially withdrawn from the channel and the fiber stripping machine is activated.

2. The apparatus of claim 1, wherein the fiber stripping machine includes an activation button, and wherein the second end of the lever depresses the activation button when the lever is in the second position.

3. The apparatus of claim 1, further comprising:
  a) a base mounted to the fiber stripping machine, wherein the lever is rotatably mounted to the base.

4. The apparatus of claim 3, wherein the base is removably mounted to the fiber stripping machine.

5. The apparatus of claim 1, wherein the lever includes a main body and an end piece, the end piece being removable from the main body.

6. The apparatus of claim 5, wherein the end piece is formed from a first material and the main body is formed from a second material different from the first material.

7. The apparatus of claim 5, wherein the lever is configured and mounted such that gravity holds the lever in the first position unless overcome by a depressing force at the second end of the lever.

8. The apparatus of claim 7, wherein a center of gravity of the lever is located between the first end of the lever and a pivot axis of the lever.

9. A strip stop mechanism for a fiber stripping machine, the strip stop mechanism comprising:
  a) a base mountable to the fiber stripping machine; and
  b) a lever rotatably mounted to the base, the lever extending between a first end and a second end, the first end defining an end stop for an optical cable inserted into the fiber stripping machine, the second end defining a handle portion for moving the lever from a first position to a second position.

10. The strip stop mechanism of claim 9, wherein the base includes mounting locations for mounting the base to the fiber stripping machine.

11. The strip stop mechanism of claim 9, wherein the lever includes a main body and an end piece, the end piece being removable from the main body.

12. The strip stop mechanism of claim 11, wherein the end piece is formed from a first material and the main body is formed from a second material different from the first material.

13. The strip stop mechanism of claim 9, wherein when the base is mounted to the fiber stripping machine, gravity holds the lever in the first position unless overcome by a depressing force at the second end of the lever.

14. The strip stop mechanism of claim 13, wherein a center of gravity of the lever is located between the first end of the lever and a pivot axis of the lever.

15. A method of stripping an optical fiber, the method comprising:
   a) inserting the optical fiber into a channel of a fiber stripping machine until an end of the optical fiber abuts a first end of a lever residing within the channel;
   b) moving the lever to cause the first end of the lever to at least be partially removed from the channel; and
   c) activating the fiber stripping machine to strip the optical fiber.

16. The method of claim 15, wherein the step of moving the lever includes moving the lever to cause a second end of the lever to contact an activation button of the fiber stripping machine.

17. The method of claim 15, further including the step of clamping the optical fiber prior to the step of moving the lever.

18. The method of claim 15, wherein the step of activating the fiber stripping machine includes clamping the optical fiber with grippers within the channel.

19. The method of claim 15, further comprising:
   a) releasing the lever once the optical fiber has been stripped by the fiber stripping machine.

20. The method of claim 15, further comprising:
   a) selecting and mounting an end piece onto a main body of the lever, the end piece having a predetermined length defining a stripping length for the optical fiber.

* * * * *